United States Patent [19]

Renton

[11] Patent Number: 5,389,345
[45] Date of Patent: Feb. 14, 1995

[54] SWIMMING POOL ACCESSORIES

[76] Inventor: Michael B. Renton, 31 4th Avenue, Parktown, North, Johannesburg 2193, South Africa

[21] Appl. No.: 130,418

[22] Filed: Oct. 1, 1993

Related U.S. Application Data

[63] Continuation of Ser. No. 820,126, Jan. 14, 1992, abandoned, which is a continuation-in-part of Ser. No. 610,920, Nov. 9, 1990, abandoned.

[30] Foreign Application Priority Data

| Nov. 9, 1989 | [ZA] | South Africa | 89/8550 |
| Dec. 11, 1989 | [ZA] | South Africa | 89/95448 |
| Jun. 1, 1990 | [ZA] | South Africa | 90/4193 |
| Jan. 14, 1991 | [ZA] | South Africa | 91/0218 |

[51] Int. Cl.$^6$ ............ C02F 1/00; E04H 4/16
[52] U.S. Cl. ............ 422/264; 4/490; 210/169; 210/198.1; 422/263; 422/265; 422/275; 422/276; 422/277
[58] Field of Search .......... 422/263, 265, 275–278, 422/264; 4/226–228, 231–232, 490; 210/198.1, 169; 252/174

[56] References Cited

U.S. PATENT DOCUMENTS

| 991,825 | 5/1911 | Bogie | 4/228 |
| 2,934,409 | 4/1960 | Blehl | |
| 3,423,182 | 1/1969 | Klasky | 422/266 |
| 3,677,711 | 7/1972 | Bond | 422/265 |
| 3,792,979 | 3/1974 | Clinton | 422/265 |
| 3,837,017 | 9/1974 | McDuffee | 4/228 |
| 3,856,932 | 12/1974 | May | 252/174 X |
| 4,217,331 | 8/1980 | Schaub | 422/265 |
| 4,277,853 | 7/1981 | McDuffee | 4/228 |
| 4,318,891 | 3/1982 | Kim | 422/263 |
| 4,350,666 | 9/1982 | Klutts | 422/263 |
| 4,365,362 | 12/1982 | Corey | 4/228 |
| 4,435,858 | 3/1984 | Dolan | 4/228 |
| 4,546,503 | 10/1985 | Casberg | 4/496 |
| 4,630,634 | 12/1986 | Sasaki et al. | 137/268 |
| 4,643,881 | 2/1987 | Alexander et al. | 422/265 |
| 4,822,571 | 4/1989 | Nicholson et al. | 422/278 |
| 4,876,003 | 10/1989 | Casberg | 210/169 |
| 4,928,813 | 5/1990 | Casberg | 206/0.5 |
| 5,120,504 | 6/1992 | Petro-Roy et al. | 435/291 X |

FOREIGN PATENT DOCUMENTS

| 0164844 | 12/1985 | European Pat. Off. | |
| 2001250 | 9/1970 | Germany | |
| 9006129 | 11/1990 | Germany | |
| 912405 | 3/1991 | South Africa | |
| 1229081 | 4/1971 | United Kingdom | |
| 8910899 | 11/1989 | WIPO | 210/169 |

Primary Examiner—Robert J. Warden
Assistant Examiner—Krisanne M. Thornton
Attorney, Agent, or Firm—Browdy and Neimark

[57] ABSTRACT

A water treatment pill is disclosed having a cylindrical periphery and disklike end faces and comprising material that in use is eroded to treat the water. The cylindrical periphery of the pill is covered with a cover of water impermeable material to prevent water coming into contact with the periphery of the pill. A passage is provided between the sleeve and the periphery of the pill and running from one end face to the other. This passage may be formed in the periphery of the pill or in the sleeve. One end face of the pill is closed off by a closure member. Thus with the axis of the periphery vertical and the closure member on the upper face of the pill, any gases which may accumulate below one end face of the pill can escape along the groove to the other end face.

25 Claims, 10 Drawing Sheets

SWIMMING POOL ACCESSORIES

This application is a continuation of application Ser. No. 07/820,126, filed Jan. 14, 1992, now abandoned and which is a continuation in part of my patent application Ser. No. 07/610,920, filed 9th Nov. 1990, now abandoned, the contents whereof are incorporated by reference.

This invention relates to water treatment devices.

BACKGROUND TO THE INVENTION

The invention is concerned with a water treatment device of the kind used in treating water in for example a swimming pool or other body of water (referred to herein as a "swimming pool" for convenience), the device comprising a water treatment pill i.e. a pill which has a cylindrical periphery and disk-like end faces and which comprises material that in use is slowly eroded to treat the water. Such a device is hereinafter referred to as "a pill".

Particularly desirable forms of pill comprise solid trichloroisocyanuric acid (hereinafter referred to as "TCIA") or calcium hypochlorite ("CHC") as the erodable material.

It is important with pills that the erosion of the pill should be constant or substantially constant so that there is a constant rate of water treatment. Attempts have been made to control the rate of dissolution of the tablet including that shown in U.S. Pat. No. 4,546,503. In that specification, a pill is shown having a frusto-conical lower portion and an enlarged bore through the center. The pill is housed in a container 11. There is water contact between the water and virtually the entire exposed surface of the pill including the surfaces surrounding the bore. Because of this large area of contact between the water and the pill, erosion is accelerated. Further, erosion of the pill takes place in a non-uniform manner. Another way of controlling erosion is for only the disk like ends of the pill to be exposed to the water because there is then a constant area of the pill in contact with the water irrespective of the thickness (or axial height) of the pill. Consequently the cylindrical periphery of the pill should be covered to prevent water coming into contact with the periphery of the pill. British patent specification 1 229 081 (May) shows such an arrangement. Other similar arrangements are shown in U.S. Pat. Nos. 4,876,003 and 4,928,813 (both Casberg) although in the latter cases the whole end of the pills are not exposed, initially at least, so that erosion takes place in a fairly uneven manner as illustrated in FIG. 4 of U.S. Pat. No. 4,876,003. Furthermore the arrangement disclosed in both these specifications very large and specially made pills are required which complicates and increases the cost of manufacture. These pills can in practice only be used in a weir (or skimmer) where the high flow rate will erode CHC far too quickly for the pills to be practical.

It is often desirable to mount the pills with their axes vertical. Reasons for this include the desirability to make the container for the pills as shallow as possible particularly when a plurality of pills are to be mounted in the container. Furthermore with the pills so mounted, the erosion pattern is more constant than when the pills are mounted with their axes horizontal. In such circumstances, a problem arises in that as the pill erodes, a bubble of gas is often formed below the lower disk-like surface of the pill. This has two major disadvantages.

First, the undersurface of the pill will not be in contact with the water and therefore will not be eroded thereby. This is disadvantageous where the pill has both surfaces nominally exposed to the water but is more serious if only the under surface is exposed as mentioned below. Furthermore the location of a bubble of gas underneath the pill will have a buoyancy effect which will tend to raise a housing containing the pill. This could cause the housing to tip or to invert which may in certain circumstances have unwanted and possibly harmful consequences.

SUMMARY OF THE INVENTION

I have found that in order to overcome the disadvantages mentioned above, it is desirable to provide a narrow air passage between the pill and the coating or casing so that should gas be formed below the underside of the pill, the gas will be able to escape to the upper side of the pill along this passage. The groove may be formed in the pill but is preferably formed in the casing.

As the pill erodes, the radius of the passage increases. Thus the area of the end face of the pill decreases. Also the length of the passage (i.e. the distance between the end faces of the pill) decreases with thinning of the pill thus affecting the exposed area of the passage. I have found that as a consequence substantially the same surface area of the pill is exposed to the water being treated and consequently erosion of the pill remains substantially constant. This I have found is true whether one or both the end faces are eroded.

The passage is preferably very small being just sufficient to allow gas to escape. It must however be large enough to avoid it being clogged by any residue that may be formed as the pill is eroded, as occurs with a CHC pill. The width of the passage is preferably less than two millimeters and preferably one millimeter. Put another way, the cross-sectional area of the passage is conveniently no more than 0.125%, preferably less than 0.10% and preferably about 0.03% of the cross-sectional area of the pill.

When the passage is formed in the casing, the passage may have a mouth adjacent to the pill which is narrower than the main part of the passage. Thus gases can enter easily into the groove but residue would be prevented from so doing.

I have also found that in order to control and slow down the erosion of the pill, it is desirable to have a disk or the like arranged with its axis vertical and further to close off the upper disk-like surface of the pill so that this is not in contact with the water, i.e. the water is in contact with only the lower disk-like surface of the pill. In this case it is especially important to provide the passage to permit the gases to escape. I have appreciated too that with an CHC pill if the lower surface is exposed to the water, any residue that may form will fall clear and will not prevent the water from coming into contact with the active surface of the pill.

Embodiments of the invention will now be described by way of example with reference to the accompanying drawings in which the sizes of various parts are exaggerated for the purposes of clarity.

DESCRIPTION OF AN EMBODIMENT OF THE INVENTION

Referring now to FIGS. 1 to 5, there is shown a pill container 10 of the invention for use in the treatment of water in a swimming pool. The container 10 comprises a moulded plastics body of generally hexagonal cross-section and being formed with a base 12 and a cover 14.

The base 12 is generally of shallow dished construction, having a bottom wall or support surface 16 of which constitutes a support surface. Below the bottom wall 16 is a set of three equispaced domed cylindrical feet 18 at three spaced apices of the hexagon and a central, larger and axially longer, domed cylindrical member 20 that depends below the level of the feet 18. Three equispaced, shallow, generally rectangular depressions 22 are located on a pitch circle centered on the central member 20 and located close to the midpoint of the side walls of the hexagon (best shown in FIGS. 2 and 4). A peripheral wall 24 surrounds the base 12. The wall 24 ends in a projecting tongue 26 for the purpose which will become apparent.

The cover 14 is deeper than the base 12. It has a high side wall 28 with an outwardly directed flange-like bottom portion 30 having an enlarged rim 32 that has a continuous recess 34 in which the tongue 26 of the base 12 is received in a sealed condition (see FIG. 5).

On its upper surface 36, the cover 14 has three hollow radial fins 38 extending to the middle of three sides 14a, 14c and 14e of the hexagonal cover 14. The fins 38 each have an internal cross-brace 40 (see FIG. 4) for the purpose to be disclosed. The fins 38 of a container can be received in the depressions 22 in an upper container when the containers 10 are stacked one above the other for storage purposes. The fins 38 and depressions 22 ensure that the containers 10 are properly aligned during stacking.

In this embodiment, the dimensions of the parts are as follows: the distance across the flat sides of the cover 14 is 230 mm, the distance across the walls 24 is 255 mm, the external height of the container body is 44 mm, the height of the legs 18 is 12 mm, the height of the central member 20 is 18 mm, the height of the fins 38 is 24 mm and the depth of the depressions 22 is 4 mm and their length is 22 mm.

Adhered to the underside of the surface 36 is a disk of plastic foam buoyancy material 42.

A set of nodules 44 are provided on the upper surface 36 of the cover 14 at the apices thereof and a further set of nodules 46 are provided on the bottom portion 30 between the apices. When the nodules 44 and 46 are cut off, they leave openings 48 and 50 respectively through which water can pass into and out of the container 10.

The support surface 16 carries respectively mid-way along and close to three of its sides, three hollow pillars 52 that are connected to radial walls 54. The pillars 52 extend up to the underside of the upper surface 36 of the cover 14 where the cross-braces 40 bear on them. The walls 54 are no more than 4 mm high. Three short hollow pillars 56 (see FIGS. 3 and 4) are located along the length of the walls 54. A further set of hollow tubular pillars 58 are located respectively midway between the pillars 52. At their upper ends, the pillars 58 have internal flanges 60. Hollow projections 62 are provided on the underside of the surface 36. These projections 62 fit into the upper ends of the pillars 58 and have outward flanges 64 that lock against the flanges 60 to secure the parts together. The outer surfaces of the flanges 60 and 64 are inclined to enable them to move past each other more easily with inserting the projections 62 into the pillars 58.

Six pills 68 are received in the container 10 at the corners with each pill 68 located between the pillars 52, 56 and 58. Six supports 70 extending upwardly from the bottom wall 16 project radially inwardly from the corners of the container. Two additional supports 70a extend from each side of the walls 54 and are of sufficient length to provide supports for adjacent pills. Short tongues 72 extend downwardly from the upper surface 36 to hold the pills 68 against upward movement.

Each pill 68 comprises solid tricholorisocyanuric acid (TCIA) material for chlorinating the water in the pool. Each pill 68 is cylindrical in shape having a cylindrical periphery 74 with flat upper and lower surfaces 78 and 80 at its ends. All the pills 68 are of a conventional size of twenty four millimeters thick and of eighty millimeters diameter.

The cylindrical periphery 74 of each pill 68 has a water impervious sleeve 76 closely fitting thereon so that in use water in the container will contact only the upper and lower surfaces 78 and 80 of the pill 68.

Figure 1:
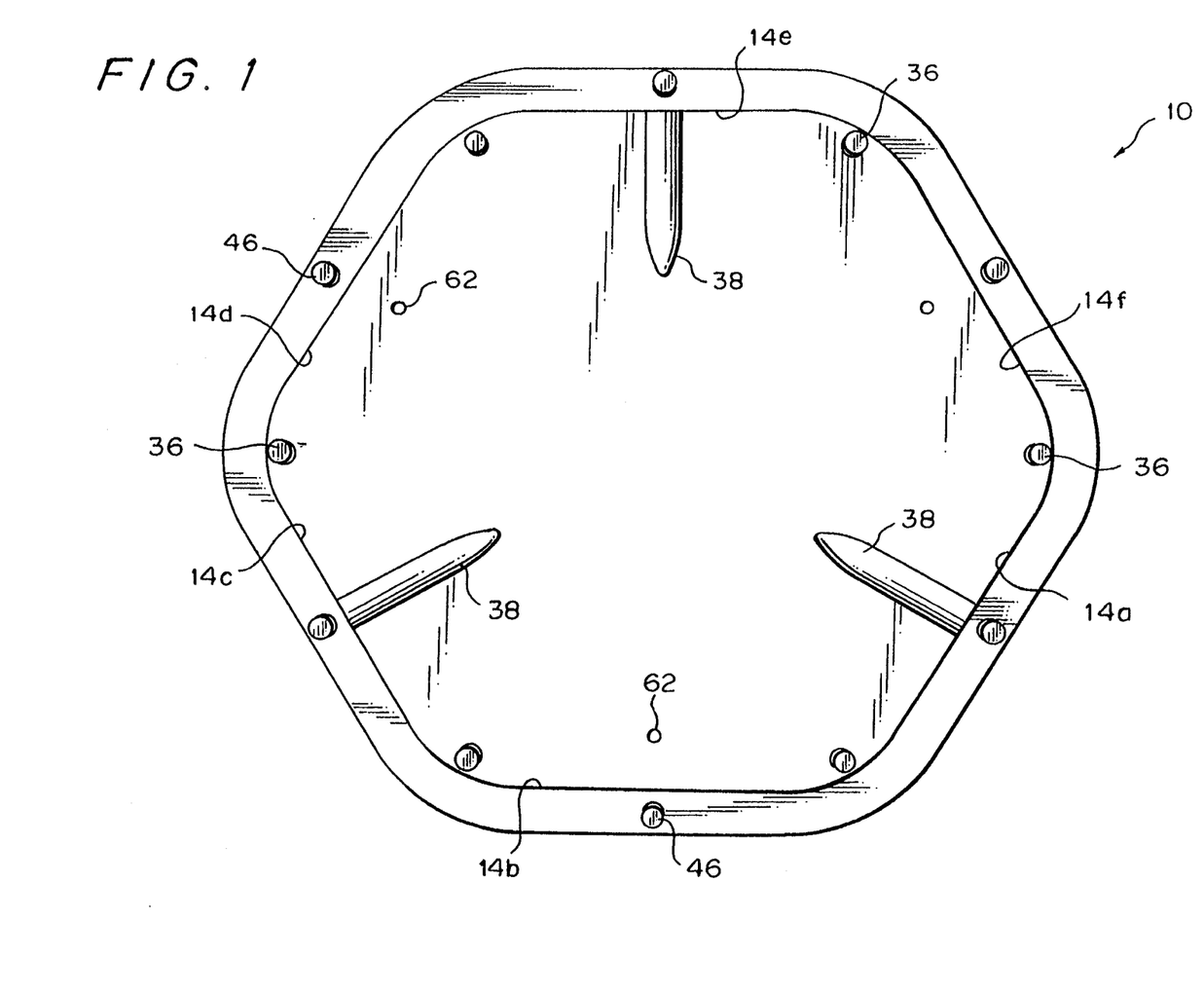
FIG. 1 is a plan of a pill container of the invention.
Figure 2:
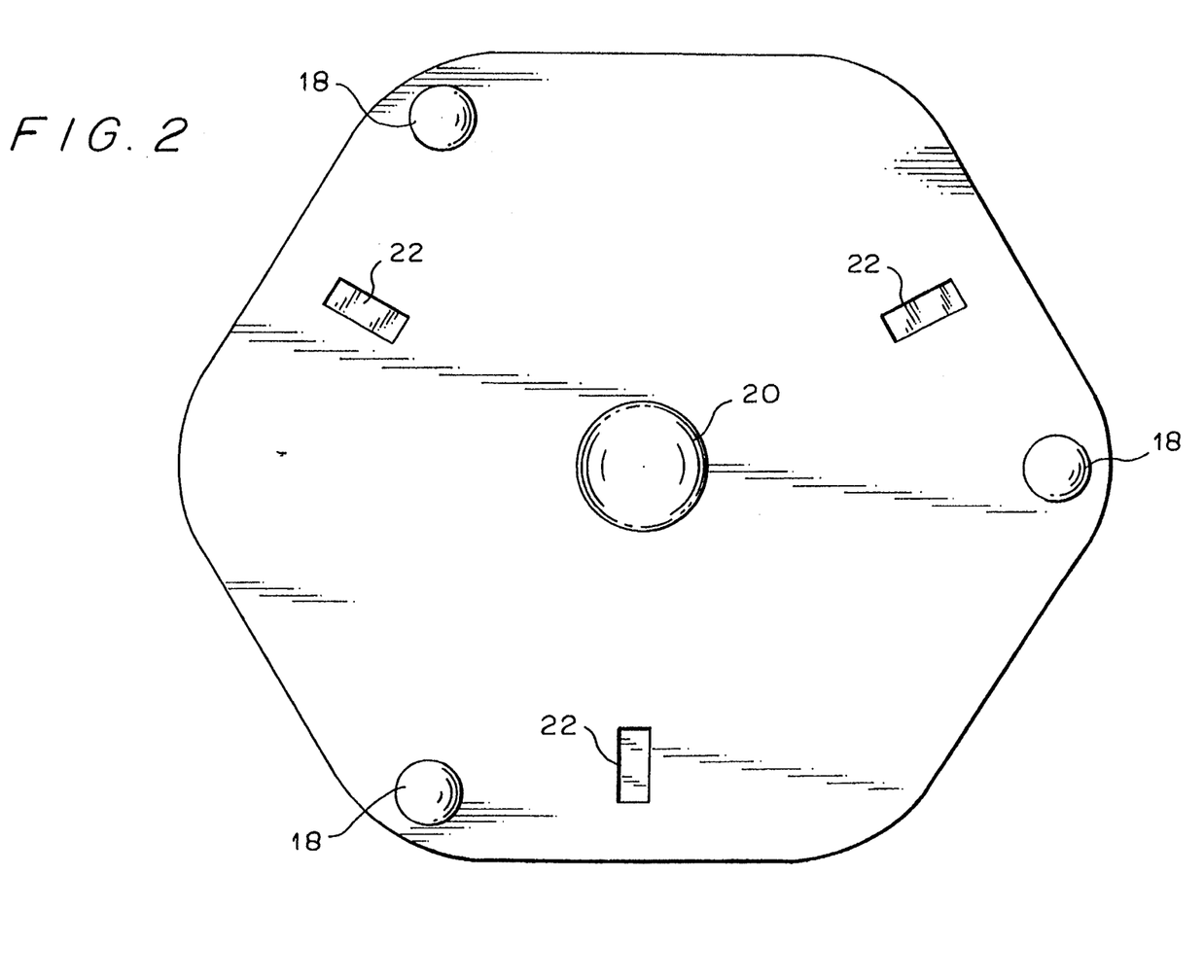
FIG. 2 is an underplan of the container.
Figure 3:
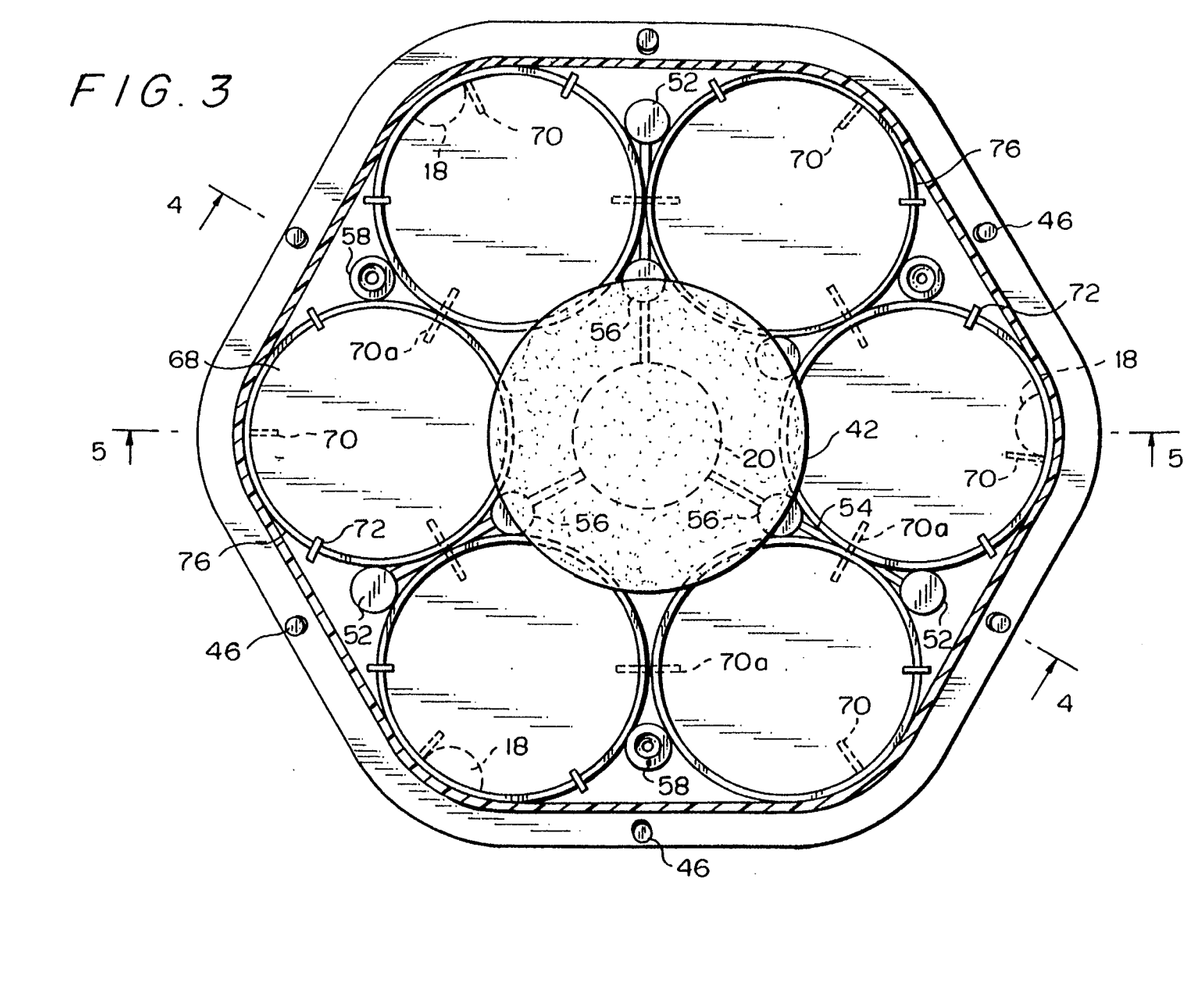
FIG. 3 is a horizontal cross-section of the container the section being taken on line 3—3 of FIG. 4, FIGS. 4 and 5 are respectively sections on lines 4—4 and 5—5 of FIG. 3.
Figure 4:
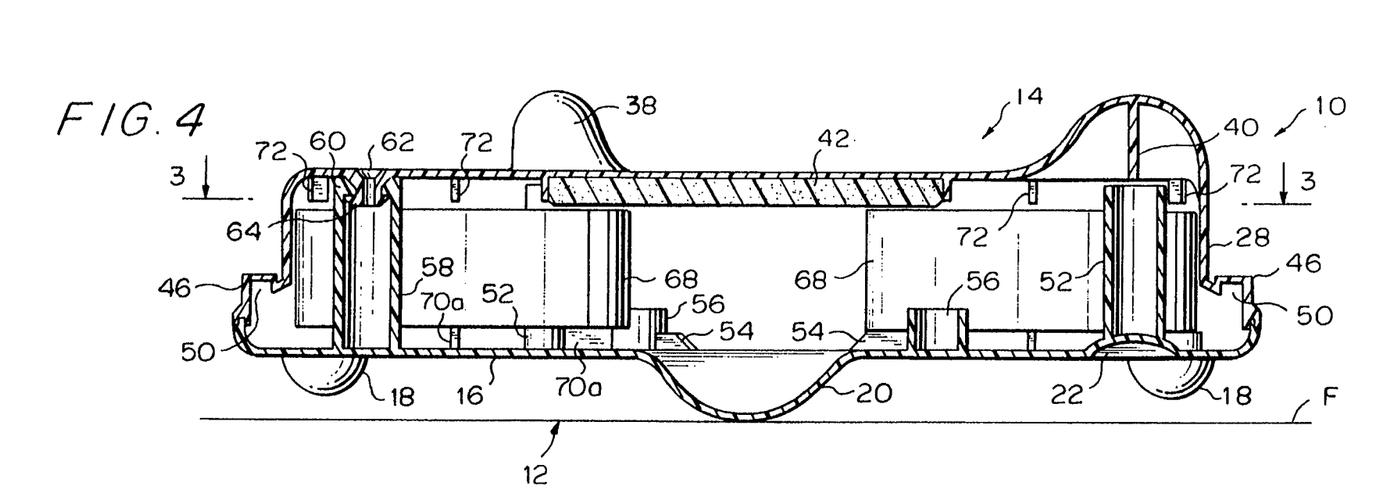
Figure 5:
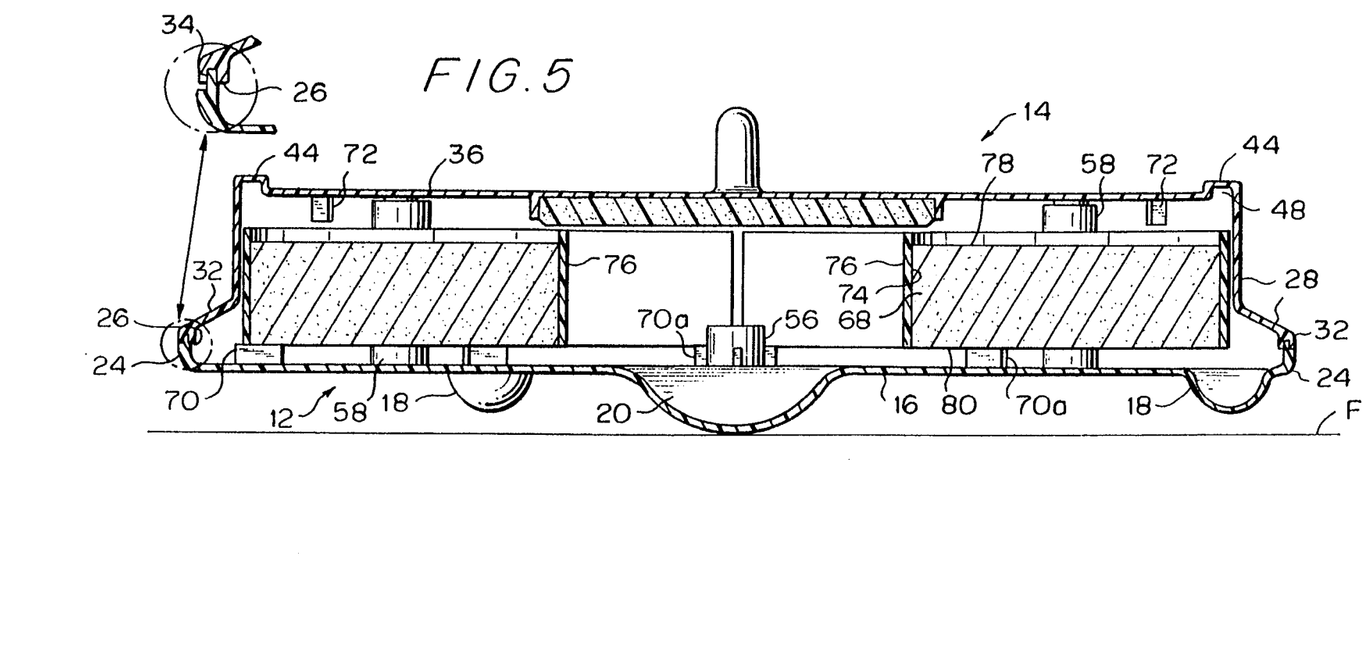
Figure 6:
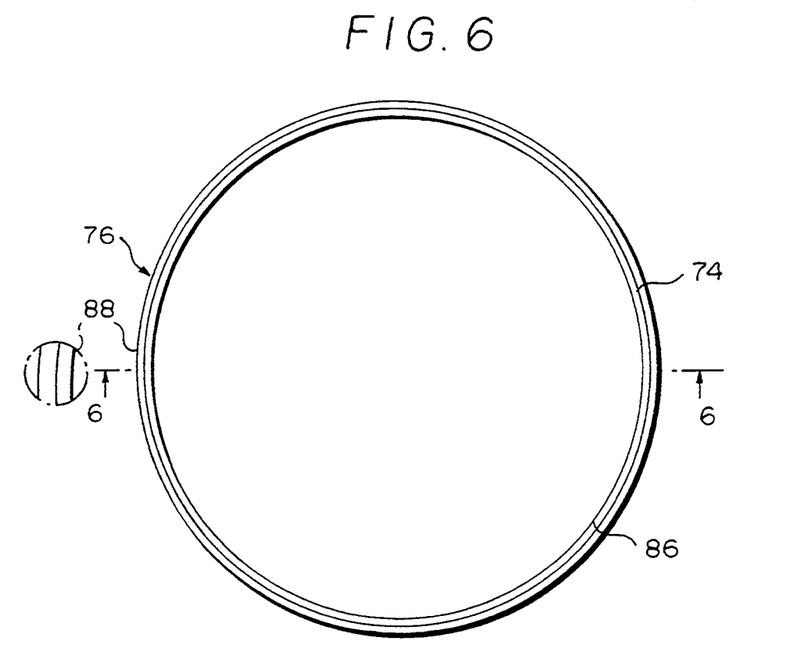
FIG. 6 is a plan of a sleeve for receiving therein a pill.
Figure 7:
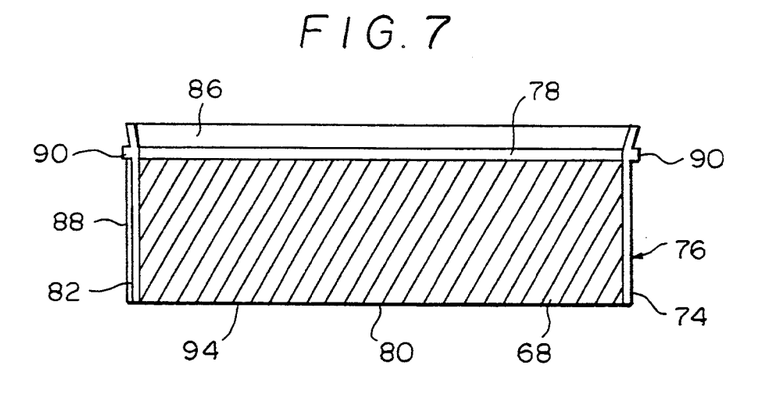
FIG. 7 is a section through on line 7—7 of FIG. 6.

The sleeve 76 comprises a low density polyethylene moulding consisting of a one millimeter thick sleeve 82 (see FIGS. 6 and 7) of twenty six millimeters axial height and having a four millimeter inwardly tapering inlet section 86 to facilitate feeding the pill 68 into the sleeve 76. At one position, the sleeve 82 has an half millimeter thickening. On the inside of this thickening is a shallow groove 88 extending from the lower end of the sleeve 82 to near the inlet section 86.

The groove 88 is one millimeter deep and two millimeters wide for the purpose which will be described. It will be noted that the cross-sectional area of the groove is less than 0.05% and approximately 0.03125% of the cross-sectional area of the pill. It will further be noted that the area of the periphery of the pill which is exposed to the groove is less than 0.1% and is about 0.08% of the total area of the periphery.

On the outside of the sleeve 76 at the juncture of the inlet portion 86 and the sleeve 82 there is a low, one millimeter thick by two millimeter wide, peripheral rim 90.

The pill 68 is inserted into the sleeve 76 as follows. The sleeve 76 is placed in a mould (not shown) until the rim 90 engages the mould to prevent further movement of the sleeve 76. A pill 68 is brought to the inlet section 86 to guide it into the sleeve 82. A large flat piston is placed against the flat upper side of the pill and force is applied to move the pill into the sleeve 82 leaving the entrance portion 86 free of the pill. The edges of this portion 86 will, in the assembled container 10, engage the tongues 72 depending from the upper surface 36.

In use, all the nodules 44 and 46 are cut off and the container 10 is immersed in water until sufficient water has entered the openings 48 and 50 to fill the container 10 with water. The container 10 is then released into the pool. Because of the effect of the buoyancy material 42 and the drag of the fins 38, the container 10 will sink in an upright position in the water and will rest with the domed member 20 and one or more of the feet 18 on the floor F of the pool. Water will circulate through the container 10 through the openings 48 and 50. The water will contact the upper and lower surfaces 78 and 80 of the pills 68 within the sleeves 76. A certain amount of the pill material will dissolve in the water thereby giving off gases or treating the water and, because this water will escape through the upper openings 48, thereby treating the water in the pool.

Should the water in the pool move, as when a swimmer approaches the location of the container 10, the container 10 will rock on the central domed member 20 improving the water flow into and through the container 10.

Any gases that might accumulate below a pill 68 will escape along the groove 88 to the upper portion of the container where they will escape through the openings 50 formed by cutting off the nodules 44. Thus the possibility of the container inverting because of buoyancy below the pill 68 is minimized or obviated. Also the possibility of the gases forming a barrier to the water engaging the underside 80 of the pill is avoided.

After the pills 68 are substantially absorbed, the buoyancy of the buoyancy material 42, together with the gases trapped in the hollow fins 38, will be such as to permit the container 10 to rise to the surface of the pool water. The owner of the pool will now know that the container 10 and its pills 68 must be replaced. The spent container 10 can be discarded or left floating in the pool until all the pill material has been used.

Because the container is carried on the domed member 20 and the feet 18 there will always be a sufficient space between the container 10 and the pool bottom for there to be water movement therebetween and further which would prevent the pH of the water falling causing iron in the water to precipitate out and stain the floor F of the swimming pool. Should the container invert for any reason, the fins 38 will hold the upper surface 36 of the container off the floor of the pool so that there will be no of minimal staining of the pool bottom.

DESCRIPTION OF FIRST MODIFIED PILL

Figure 8:
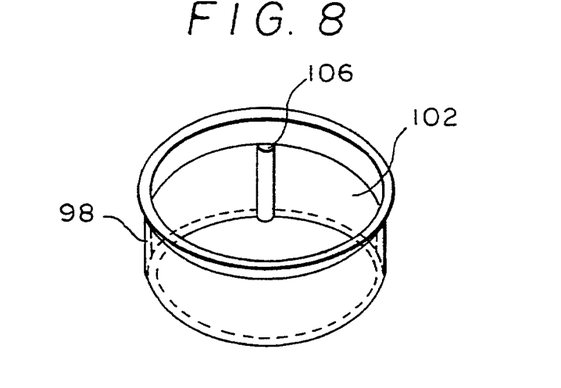
FIG. 8 is perspective view of modified pill and sleeve.

Referring now to FIG. 8 there are shown a modified arrangement of a pill 102 in a sleeve 98 in which the sleeve 98 is similar to the sleeve 76 but does not have the thickening or groove 88. Instead the pill 102 is moulded with a vertical groove 106 on its periphery. This groove 106 has a radius of 1 mm. Thus the cross-sectional area of the groove 106 is less than 0.05% and is approximately 0.03126% of the cross-sectional area of the pill and the area of pill periphery constituted by the groove forms approximately 1.25% of the area of the periphery of the pill 102.

DESCRIPTION OF ANOTHER MODIFIED PILL OF THE INVENTION

Figure 9:
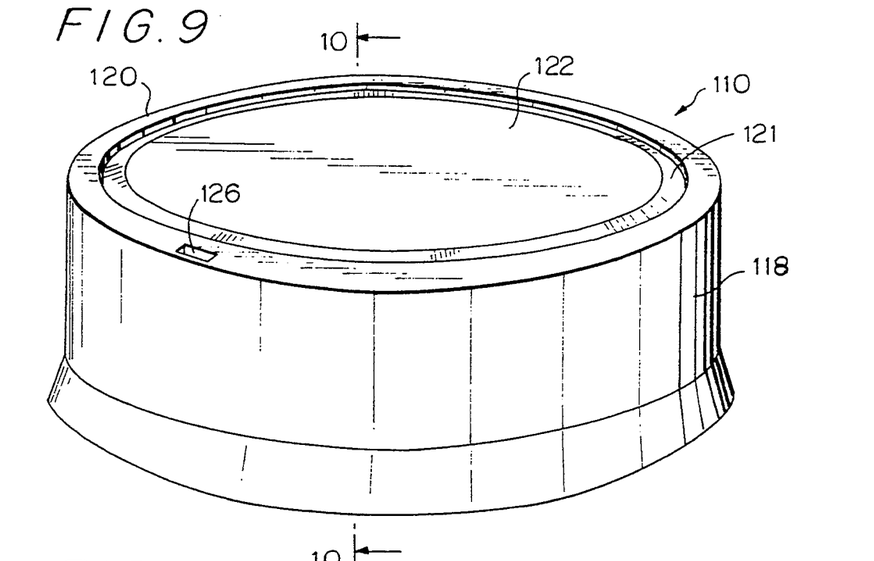
FIG. 9 is a perspective view of a modified pill in a sleeve of the invention.
Figure 10:
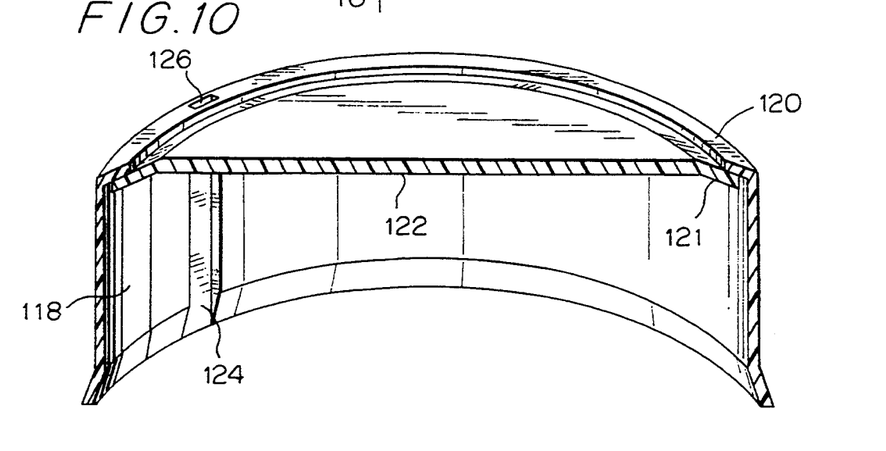
FIG. 10 is a section on line 10—10 of FIG. 9.

Referring to FIGS. 9 and 10, there is shown a pill 110 received within a closely fitting plastic sleeve 118 having a frusto-conically shaped inward flange 120 at one end. Fitting against the flange 120 is the frusto-conically shaped edge 121 of a disk 122 of water impervious material such as polyvinyl chloride. An axial groove 124 of substantially rectangular cross-section is formed in the inside surface of the sleeve 118. The depth of the groove 124 is approximately one millimeter and the width about two millimeters. This groove 124 connects with an opening 126 in the flange 120.

At the lower end, the tube 118 has a flared end part 128. This serves to guide the pill 110 into the sleeve 118 during insertion. Such insertion is carried out by placing the sleeve in a mould with the disk 122 resting against the flange 120 and then pressing the pre-formed pill 110 into the sleeve by means of a ram. Any air that may be trapped between the pill 110 and the disk 122 can escape through the groove 124.

The pill will, in use, be mounted with its axis vertical and will have the flange 120 at its upper end. The sleeve 118 will prevent or reduce water coming into contact with the cylindrical outer surface 112. Thus water will engage only the end face 114 (the face 116 being protected from water erosion by the disk 122) so that only the face 114 will be substantially eroded by the water. Should any gases be formed on the underside of the pill 110, these will escape along the groove 124 before they have a buoyancy effect on the pill or any container in which they are housed.

The pills 110 are used in the same manner as the pills 68.

DESCRIPTION OF A THIRD MODIFIED PILL OF THE INVENTION

Figure 11:
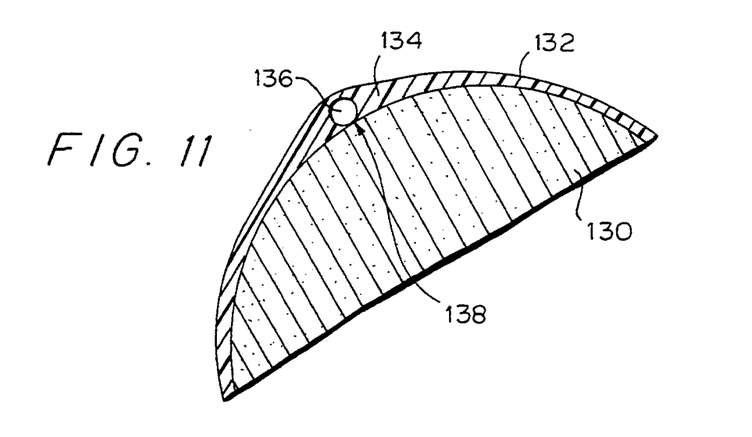
FIG. 11 is a detail plan through a modified pill arrangement of the invention.

Reference is now made to FIG. 11 which is a transverse section through the sleeve of pill 130 which is identical to the pill described with reference to FIGS. 9 and 10 save as is illustrated in FIG. 11.

The pill 130 has a sleeve 132 which has an enlarged vertical portion 134. Within this portion 134 there is a passage 136 of substantially circular cross-section having a diameter of about three millimeters. At the inner side of the passage 136 there is a mouth 138 having a width of one millimeter running the length of the portion 134. This passage 136 opens adjacent to the flange of the sleeve.

Water will enter the passage 136 and will commence to erode a groove in the periphery of the pill. The erosion will form bubbles which will run up the side of the pill adjacent escaping through the passage. The water will continue to engage the pill circumference enlarging the radius of the groove.

This sleeve 132 is of particular value with a CHC pill as the mouth 138 will permit air to enter the passage 136 but will normally prevent any residue that may be formed from entering the passage 136. Even if the residue should block a portion of the mouth, there will be sufficient length of the mouth open to permit air to continue to enter the passage.

A further advantage of this arrangement is that the sleeve will be stronger at the portion 134 and will resist the tendency to flatten as the groove enlarges which would result in the pill being loosened in the sleeve 132.

DESCRIPTION OF A FOURTH MODIFIED PILL OF THE INVENTION

Figure 12:
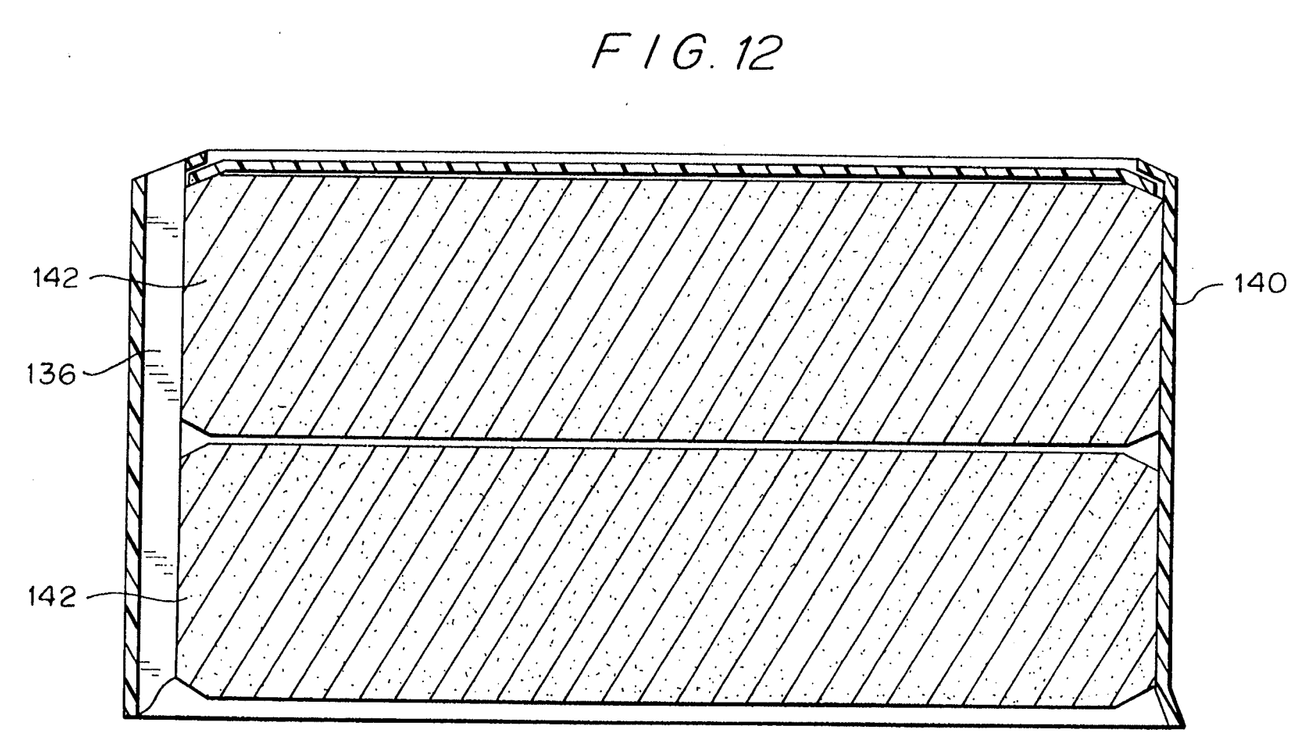
FIG. 12 is a vertical section through another pill arrangement of the invention.
Figure 13:
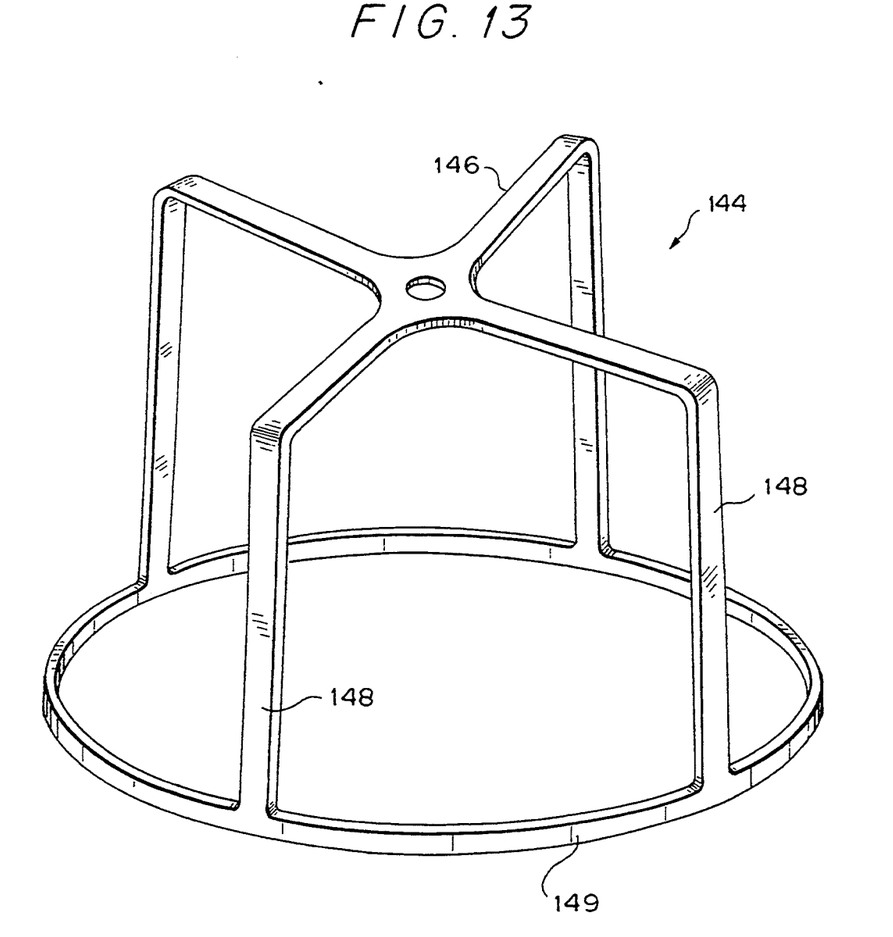
FIG. 13 is a perspective view of a pedestal support.
Figure 16:
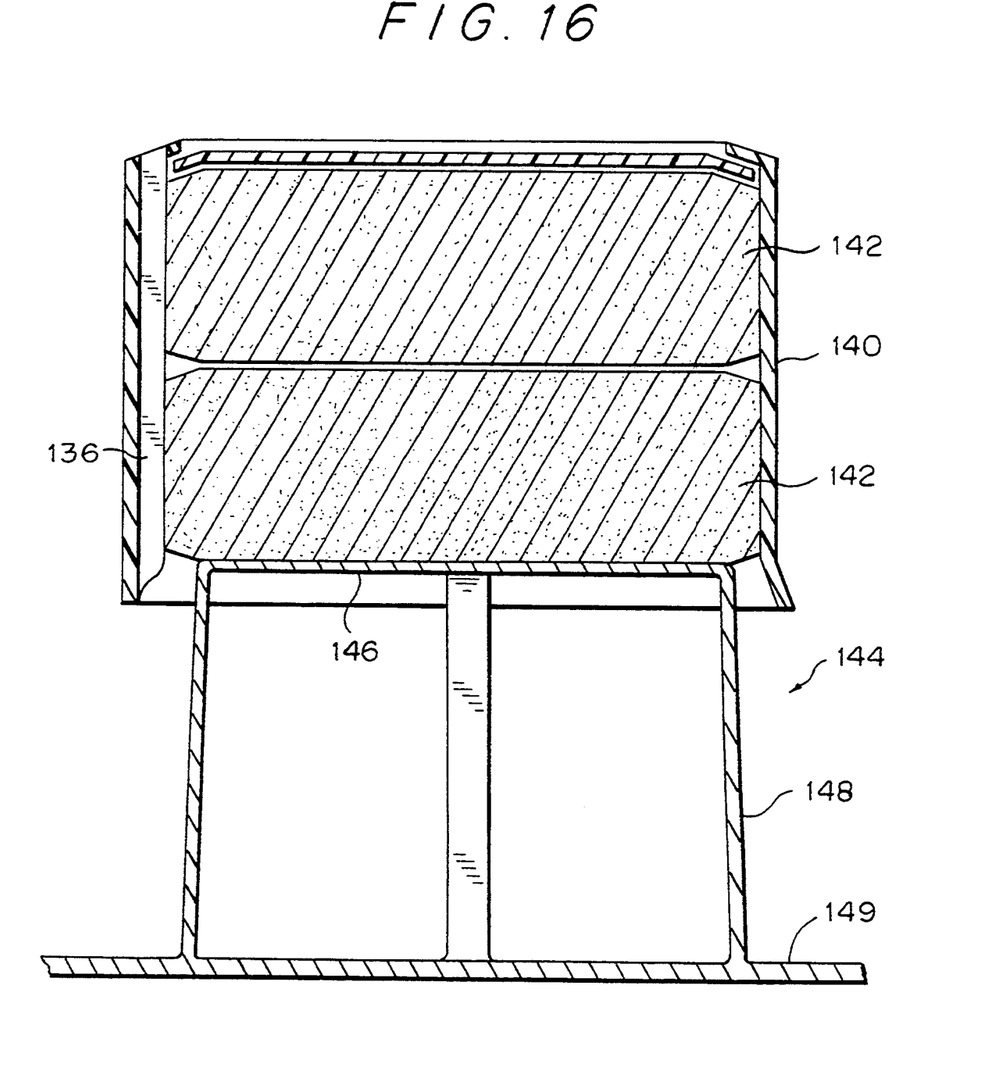
FIG. 16 is a section on line 16—16 of FIG. 15.

In FIGS. 12 and 16 there is shown a further arrangement of the invention. Here the sleeve 140 is substantially identical with the sleeve 132 described above (similar parts being given the same reference characters) save that it is of greater axial length so that two CHC pills 142 are received therein. The pill arrangement is mounted on a pedestal support 144 (shown in FIGS. 13 and 16). The support 144 comprises a cruciform grid 146 to carry the pills 142 and to fit within the sleeve 132. The grid 146 is carried on four legs 148 that extend upwardly from a base (which is shown in FIG. 13 as being a ring 149 but which would normally form part of a multi-pedestal frame supporting a multiplicity of pills. The length of the legs 148 is slightly greater than the axial height of the sleeve 140. As the pills 142 erode, the sleeve 140 slides down the support but there is always an opening below the pills into which the water can enter to engage the lower end of the pills. Because of the softness of the CHC the pills tend to collapse towards the end of their lives. Therefore it is necessary for the full period of the erosion of the pill.

DESCRIPTION OF A FIFTH MODIFIED PILL OF THE INVENTION

Figure 14:
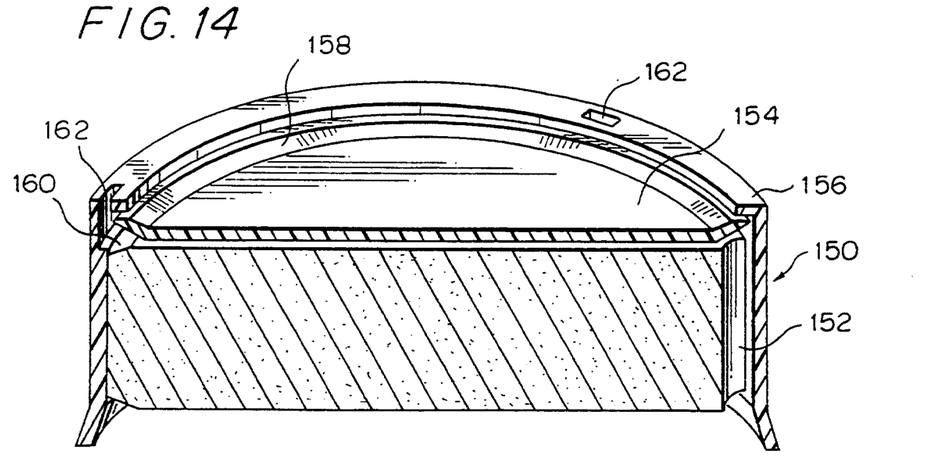
FIG. 14 is a perspective section through yet another pill of the invention.

Reference is now made to FIG. 14. The pill 150 is similar to the pill 102 of FIG. 8 with an axially extending groove 152 forming a gas passage running along the periphery of the pill. However a disk 154 of water impervious buoyant material such as expanded polystyrene is introduced between the flange 156 of the sleeve and the pill. The edge 158 of the disk 154 extends upwardly and is of generally frusto-conical form and engages the flange 156 in such a way that there is an annular passage 160 at the upper end of the pill. Three openings 162 are provided in the flange and the annular passage contacts with all of them. Thus it is not necessary to align the groove 152 with any of the openings 162 in the flange 156.

DESCRIPTION OF A MODIFIED CONTAINER OF THE INVENTION

Figure 15:
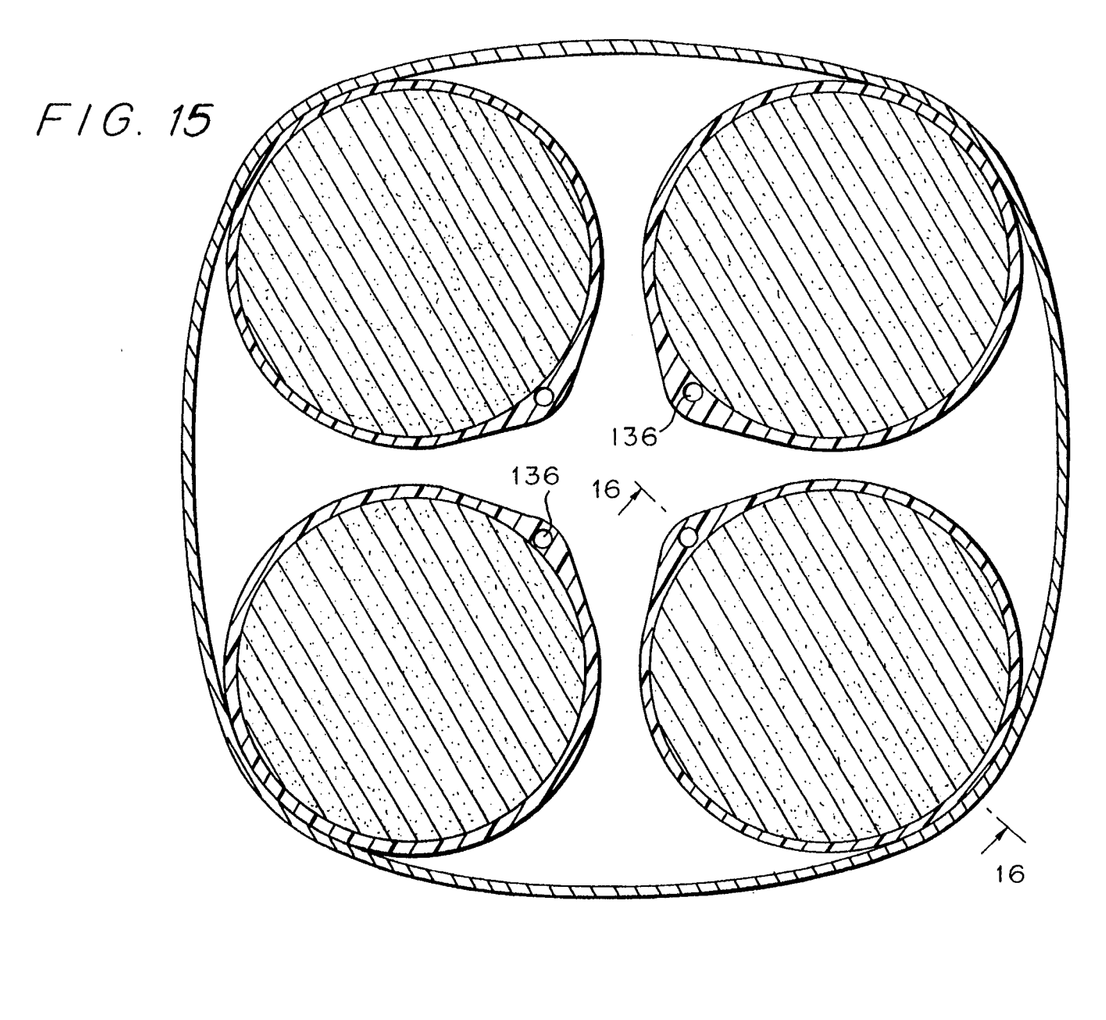
FIG. 15 is a detail plan of a housing for the pills.

In FIG. 15 there is shown diagrammatically a modified container 170. The container 170 contains four pills of the kind shown in FIGS. 12 and 16. All the pills are arranged with the passages 136 radially innermost.

The reason for so arranging the pills is as follows: In most pools, the water flow is from the shallow end to the deep end and a container resting on the sloping floor of the pool will have its upstream side higher than its downstream side. As the pills erode in their sleeves, in this sloping position, the upstream pill tends to trap gases below its lower surface. These gases form a bubble that separates the the pill surface from the water being treated and this slows down the erosion rate of the upstream pill. In contrast the gases generated from below the downstream pill will flow upwards toward the passage and will escape thereby ensuring that water being treated is always in contact with the lower pill surface. Thus the erosion rate of the downstream pill will be greater than that of the upstream pill. This inclination effect is further enhanced toward the end of the containers' useful life. As the container is designed to float to the surface of the pool when the pill material is exhausted or nearly exhausted, the lighter side of the container, will be the first to rise off the pool floor. This will be the upstream side of the container. The result will be that the inclination of the container (as mentioned above) will be increased and an even larger pocket of gas will be trapped under the upstream pill to slow still further its erosion rate relative the erosion rate of the downstream pill. This effect will continue until the remaining mass of the pill material provides insufficient ballast and the container floats to the surface of the pool.

This will prove to be counter to the usual arrangement where, I have found, the pills on the upstream side of the container tend to erode at two to five times the rate of the pills placed on the downstream side. This is probably due to the water passing through the container taking the shortest route and hence most of the water flowing through the container exits through vents before it reaches the downstream side of the container. Consequently there will be substantially constant erosion of all the pills.

Rates of Erosion

Reference is made to the following tables which indicate the surface area of the pill which is exposed to the water when the pill is encased in a grooved sleeve. The figures given herein are calculated on the assumption that the depth of erosion will be the same for each unit of time over the entire exposed surface of the pill and that that erosion will be 1 mm per day. The pills are of 100 mm diameter and 30 mm thick.

Both tables relate to pills have a sleeve that prevents water engaging the periphery of the pill except for a 1 mm strip extending along the axial length of the pill. Table A relates to a pill where both end surfaces are exposed to water. Table B relates to a pill having one surface only exposed to water.

TABLE A

| Point in in time | Exposed flat areas | Exposed Groove area | Total Exposed area | Area change from start |
|---|---|---|---|---|
| At start (pill 30 mm thick) | 15708 | 30 | 15738 | |
| After 5 days (pill 20 mm thick) | 15631 | 314 | 15945 | +1.3% |
| After 10 days (pill 10 mm thick) | 15400 | 314 | 15714 | −0.4% |
| After 14 days (pill 2 mm thick) | 15110 | 84 | 15194 | −3.3% |

TABLE B

| Point in in time | Exposed flat area | Exposed Groove area | Total Exposed area | Area change from start |
|---|---|---|---|---|
| At start (pill 30 mm thick) | 7853 | 30 | 7883 | |
| After 5 days (pill 25 mm thick) | 7814 | 393 | 8207 | +4.1% |
| After 10 days (pill 20 mm thick) | 7704 | 628 | 8332 | +5.7% |
| After 15 days (pill 15 mm thick) | 7523 | 647 | 8170 | +3.6% |
| After 20 days (pill 10 mm thick) | 7279 | 559 | 7838 | −0.6% |

TABLE B-continued

| Point in in time | Exposed flat area | Exposed Groove area | Total Exposed area | Area change from start |
|---|---|---|---|---|
| After 25 days (pill 5 mm thick) | 6977 | 338 | 7315 | −7.2% |
| After 28 days (pill 2 mm thick) | 6770 | 148 | 6918 | −12.2% |

From the above tables it is apparent that the chemical feed from a pill fitted in a grooved sleeve is virtually uniform through its life. This is true whether both or only one flat surface of the pill is exposed to erosion by the water being treated.

GENERAL

The invention is not limited to the precise constructional details hereinbefore described and illustrated in the drawings. For example, the grooves may be larger but are such that their cross-sectional areas are less than than nought point one per cent (0.1%) and preferably less than nought point nought five per cent (0.05%) of the cross-sectional area of the pill. Alternatively the size of the groove is such that the area of the periphery of the pill that is exposed at the groove is less than two per cent (2%), conveniently, not more than one point two five per cent (1.25%) or indeed about nought point eight per cent (0.8%) of the total periphery of the pill. The legs 148 may be resilient and bent inwardly to reduce the height of the pedestal support. The bent legs act as a spring to bias the support 144 upwardly.

Furthermore the grid on the support discused with reference to FIG. 13 may be more full to provide a more complete support for the pills. The various passages may be of different cross-sections.

It follows that the scope of the invention is to be determined solely by the scope of the appended claims.

I claim:

1. A water treatment device comprising:
   at least one substantially cylindrical pill made of solid water treatment material having a pair of end surfaces joined by a cylindrical side surface;
   a sleeve closely fitting onto the cylindrical side surface to protect substantially all of the cylindrical side surface from contact with the water being treated;
   a gas passage in said sleeve adjacent to said cylindrical side surface running from one end surface to the other end surface of the pill at said cylindrical surface, thereby exposing a narrow strip of the cylindrical side surface of the pill to the water being treated;
   a closure disc abutting said sleeve to protect one of the end surfaces against water contacting said end surfaces;
   an inwardly directed flange at one end of the sleeve, the closure disc being held by said flange against said one end surface; and
   an opening in said flange, said opening being in connection with said gas passage, so that gases can pass along the passage and exit through said opening.

2. A device according to claim 1 wherein the cover is a molded plastic sleeve.

3. A device according to claim 1 wherein the cross-sectional area of the groove is greater than zero and less than 0.1 per cent of the cross-sectional area of the pill.

4. A device according to claim 1 wherein the cross-sectional area of the groove is greater than zero and less than 0.05 per cent of the cross-sectional area of the pill.

5. A device according to claim 1 wherein the cross-sectional area of the groove is greater than zero and less than 0.03 per cent of the cross-sectional area of the pill.

6. A device according to claim 1 wherein the surface area of the groove in the cylindrical periphery of the pill is less than two per cent of the total area of said cylindrical periphery.

7. A device according to claim 1 wherein the surface area of the groove in the cylindrical periphery of the pill is about 1.25 per cent of the total area of the cylindrical periphery.

8. A device according to claim 1 wherein the surface area of the groove in the cylindrical periphery of the pill is about 0.8 per cent of the total area of the cylindrical periphery.

9. A device according to claim 1 wherein said passage is substantially circular in cross-section with a mouth opening at the cylindrical side surface of the pill.

10. A device as claimed in claim 1 wherein the edge portion of the disk is of substantially frusto-conical form.

11. A water treatment device comprising:
    at least one substantially cylindrical pill made of solid water treatment material having a pair of end surfaces joined by a cylindrical side surface;
    said pill being formed of material that in use is eroded by contact with water, wherein the cylindrical periphery is covered with a cover of water impermeable material so as to prevent water from contacting the cylindrical periphery of the pill, and wherein a groove is formed in the cylindrical periphery of the pill, said groove running from one end surface to the other end surface so that, with the axis of the cylindrical periphery vertical, any gases which may accumulate below one end face of the pill can escape along the groove to the other end face;
    a closure disk provided to protect one of the end surfaces against contact with water, the edge portion of the disk being of substantially frusto-conical form;
    the cover having an inwardly directed flange at one end thereof against which flange the edge of the disk is engaged to form a conduit between said cover, said disk and the protected end surface of said pill, the flange further having at least one opening therein leading to said conduit to permit gases therein to escape through the opening.

12. A device according to claim 1 wherein said sleeve contains at least two pills with the end faces of adjacent pills resting against one another.

13. A device according to claim 1 wherein said pills comprise calcium hypochlorite and wherein a pedestal support is provided on which an unprotected end surface of the pills can rest, the outside dimensions of the pedestal being less than the internal dimensions of the sleeve.

14. A device according to claim 13 wherein said pedestal support is mounted on peripheral legs, said peripheral legs bending when under pressure from the mass of pills so as to bias the pills upwardly.

15. A water treatment device comprising:
    a container for a plurality of substantially cylindrical pills made of solid water treatment material, and contained within the container a plurality of water treatment devices as claimed in claim 1.

16. A device of claim 1 wherein the cover is a molded plastic sleeve.

17. A device of claim 1 wherein the cross-sectional area of the groove is greater than zero and less that 0.1 per cent of the cross-sectional area of the pill.

18. A device of claim 1 wherein the surface area of the groove at the cylindrical periphery of the pill means is less than two per cent of the total area of said cylindrical periphery.

19. A device of claim 1 wherein said groove constitutes a single groove formed in the cylindrical periphery of the pill.

20. A device of claim 1 wherein said groove constitutes a single groove formed in said cover adjacent and open to cylindrical periphery of the pill.

21. A device of claim 15 in which the container has a base and means projecting from the base on which the pills are mounted in spaced relationship to said base.

22. A method for administering treating chemicals to a swimming pool comprising placing into the pool a water treatment device according to claim 11.

23. A method for administering treating chemicals to a swimming pool comprising placing into the pool a water treatment device according to claim 1.

24. A water treatment device comprising a container for a plurality of substantially cylindrical pills made of solid water treatment material and contained within the container a plurality of water treatment devices as claimed in claim 11.

25. A pill means for introducing chemicals into water at a substantially constant rate comprising a plurality of water treatment devices as claimed in claim 11.

* * * * *